US007123927B2

(12) United States Patent
Narazaki et al.

(10) Patent No.: US 7,123,927 B2

(45) Date of Patent: Oct. 17, 2006

(54) WIRELESS DATA COLLECTING SYSTEM HAVING TRANSMISSION POSSIBILITY DETERMINING MEANS

(75) Inventors: Hiroshi Narazaki, Kobe (JP); Eiji Takahashi, Kobe (JP); Takanari Shirasaka, Kobe (JP); Hideki Kinugawa, Hiroshima (JP)

(73) Assignees: Kabushiki Kaisha Kobe Seiko Sho (Kobe Steel, Ltd.), Kobe (JP); Kobelco Construction Machinery Co., Ltd., Hiroshima (JP)

( * ) Notice: Subject to any disclaimer, the term of this patent is extended or adjusted under 35 U.S.C. 154(b) by 518 days.

(21) Appl. No.: 10/425,660

(22) Filed: Apr. 30, 2003

(65) Prior Publication Data

US 2003/0211866 A1 Nov. 13, 2003

(30) Foreign Application Priority Data

May 8, 2002 (JP) ............................ 2002-132926

(51) Int. Cl.
*H04Q 7/20* (2006.01)

(52) U.S. Cl. ................ 455/456.3; 455/41.2; 455/66.1; 340/425.5; 701/50

(58) Field of Classification Search ............ 455/456.3, 455/66.1, 41.2; 340/425.5; 701/50
See application file for complete search history.

(56) References Cited

U.S. PATENT DOCUMENTS 4,023,138 A * 5/1977 Ballin ........................ 180/287
5,058,044 A 10/1991 Stewart et al.
5,798,714 A 8/1998 Nyfelt
6,006,148 A 12/1999 Strong
6,141,610 A 10/2000 Rothert et al.
2002/0016655 A1* 2/2002 Joao ........................... 701/35
2002/0033833 A1* 3/2002 Kinugawa et al. .......... 345/629
2002/0038172 A1* 3/2002 Kinugawa .................... 701/50
2003/0110667 A1* 6/2003 Adachi et al. ................ 37/348
2003/0115019 A1* 6/2003 Doddek et al. ............. 702/183
2003/0137398 A1* 7/2003 Shibata et al. ............. 340/5.61

FOREIGN PATENT DOCUMENTS

EP 1 191 484 A2 3/2002
JP 2002-167810 6/2002
WO WO 00/70530 11/2000

* cited by examiner

*Primary Examiner*—Nick Corsaro
*Assistant Examiner*—Alejandro Rivero
(74) *Attorney, Agent, or Firm*—Oblon, Spivak, McClelland, Maier & Neustadt, P.C.

(57) ABSTRACT

A wireless terminal mounted on a traveling apparatus memorizes operation data on the traveling apparatus, determines possibility of transmitting the operation data based on the electric field intensity of beacon, existence of operation data which has not been transmitted to a base station apparatus, an elapsed time after a switch of the mode (storage wait mode/delivery wait mode) of the wireless terminal, a planned storage date, and the like, and transmits a response to the beacon transmitted from the base station apparatus and operation data if the transmission is possible. When the transmission of the operation data has been completed, the wireless terminal is set to the delivery wait mode, and is switched to a state of waiting for delivery beacon transmitted from the base station apparatus to the wireless terminal waiting for delivery. When the delivery beacon is received, it is switched to the storage wait mode.

15 Claims, 5 Drawing Sheets

1
2
DATA INPUT UNIT
14
DATA MEMORIZING UNIT
13
CONTROL UNIT
12
RADIO APPARATUS (ANTENNA)
11
ELECTRIC FIELD INTENSITY DETECTING UNIT
15
RADIO APPARATUS (ANTENNA)
21
CONTROL UNIT
23
NETWORK INTERFACE
24
ELECTRIC FIELD INTENSITY DETECTING UNIT
22

WAREHOUSE OR THE LIKE

TRIGGER: RECEPTION OF STORAGE BEACON

PROCESSING: TRANSMIT OPERATION DATA TO BASE STATION APPARATUS

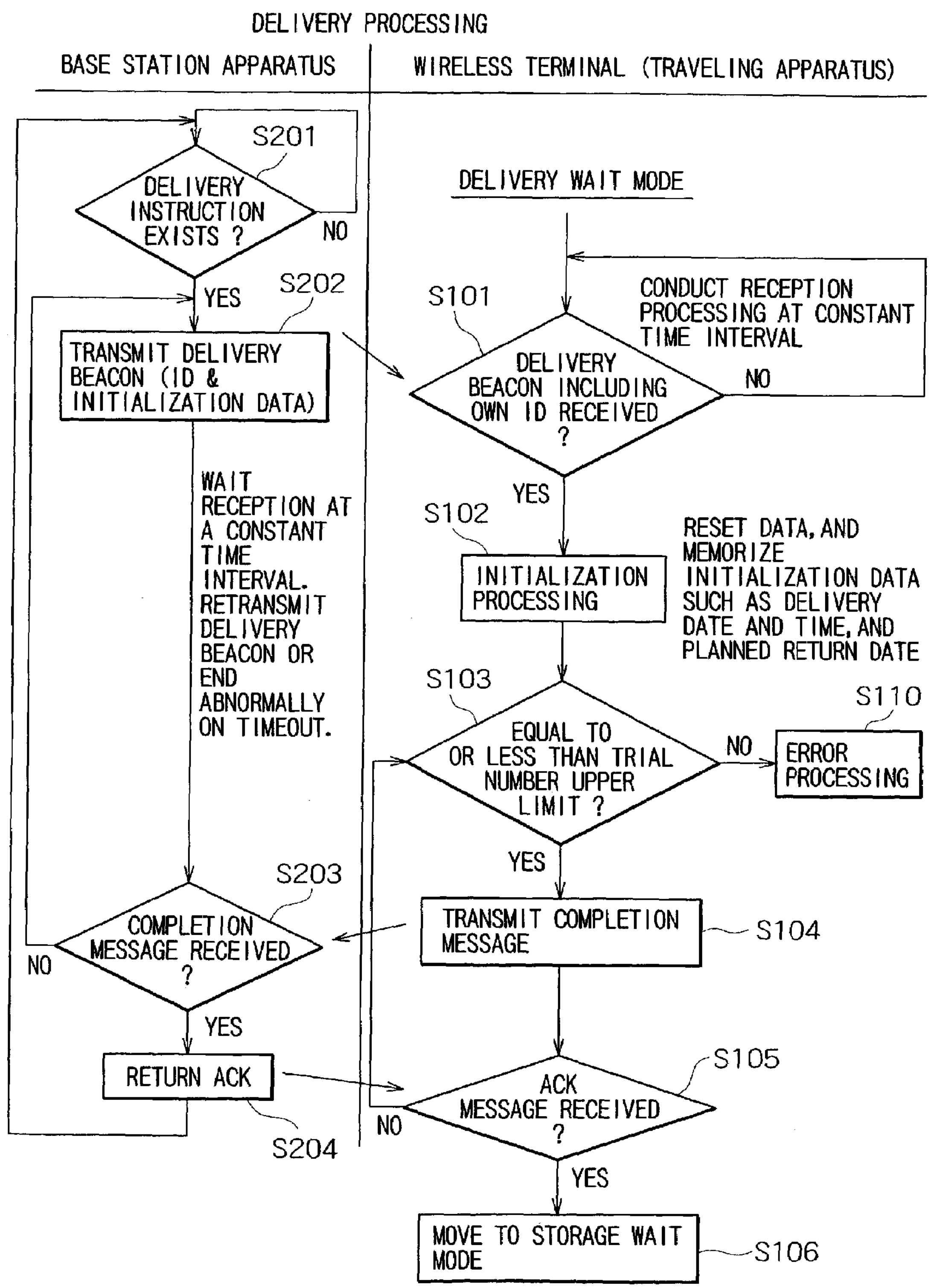
FIG. 4
DELIVERY PROCESSING
BASE STATION APPARATUS
WIRELESS TERMINAL (TRAVELING APPARATUS)
S201
DELIVERY INSTRUCTION EXISTS ?
NO
YES
S202
TRANSMIT DELIVERY BEACON (ID & INITIALIZATION DATA)
WAIT RECEPTION AT A CONSTANT TIME INTERVAL. RETRANSMIT DELIVERY BEACON OR END ABNORMALLY ON TIMEOUT.
S203
COMPLETION MESSAGE RECEIVED ?
NO
YES
RETURN ACK
S204
DELIVERY WAIT MODE
CONDUCT RECEPTION PROCESSING AT CONSTANT TIME INTERVAL
S101
DELIVERY BEACON INCLUDING OWN ID RECEIVED ?
NO
YES
S102
INITIALIZATION PROCESSING
RESET DATA, AND MEMORIZE INITIALIZATION DATA SUCH AS DELIVERY DATE AND TIME, AND PLANNED RETURN DATE
S103
EQUAL TO OR LESS THAN TRIAL NUMBER UPPER LIMIT ?
NO
S110
ERROR PROCESSING
YES
TRANSMIT COMPLETION MESSAGE
S104
S105
ACK MESSAGE RECEIVED ?
NO
YES
MOVE TO STORAGE WAIT MODE
S106

WIRELESS DATA COLLECTING SYSTEM HAVING TRANSMISSION POSSIBILITY DETERMINING MEANS

BACKGROUND OF THE INVENTION

1. Field of the Invention

The present invention relates to a wireless data collecting system which wirelessly collects operation data on a traveling apparatus such as a self-traveling work machine including a construction machine and an agricultural machine, and a portable construction machine such as a generator and a compressor from a wireless terminal installed on the traveling apparatus to a base station apparatus, and the base station apparatus of the system, and the wireless terminal of the system.

2. Description of the Related Art

Recently, for managing maintenance and the like of a movable apparatus (referred to as a traveling apparatus hereafter) such as a self-traveling work machine including a construction machine and an agricultural machine, and a portable construction machine such as a generator and a compressor, it is desired to provide a wireless data collecting system for collecting their operation data (such as on/off of the engine, the existence of the fuel, the hydraulic pressure, and the coolant temperature) at a predetermined base station through wireless communication.

Conventionally, as this type of wireless data collecting system, there is one which uses public communication network such as satellite communication or cellular phone communication to transmit operation data memorized in a traveling apparatus to a remote base station apparatus (or a server computer) and the like at a predetermined timing (such as 2 a.m. every day). Also, in this type of wireless data collecting system, a GPS is mounted on a wireless terminal provided on a traveling apparatus for confirming the location information of the traveling apparatus.

On the other hand, since the traveling apparatus such as a construction machine is often rented, it has been desired to automate delivery/storage management of the traveling apparatus (managing storage into a predetermined warehouse or a storage yard and delivery from the warehouse or the like, and managing the operation time for charging).

However, in the conventional wireless data collecting system described above, since a communication cost for the satellite communication or the cellular phone communication is charged each time the traveling apparatus communicates respectively, and additionally, the communication cost for using the mobile communication network is higher than that for the stationary (wired) communication network, there is such a problem that it is often the case that the operation cost does not meet the merit of introducing the system. Especially, the time series data and the like required for the maintenance management of the traveling apparatus is large in data quantity, there is such a problem that the problem of the communication cost becomes more remarkable.

Also, in the conventional data collecting system, it is conceivable to automate the delivery/storage of the traveling apparatus based on the position information from the GPS, map information, and the like. However, since there are such various difficult problems that the entrance and departure of a traveling apparatus into and from a relatively narrow area such as a warehouse should be surely detected by GPS, that a traveling apparatus traveling in a neighborhood of the warehouse or the like by chance should be distinguished from a traveling apparatus which is being stored, for example, and so on, it is difficult to automate the storage/delivery management of the traveling apparatus by simply applying the conventional data collecting system

SUMMARY OF THE INVENTION

The present invention is devised based on the foregoing, and the objective thereof is to provide a wireless data collecting system, a base station apparatus thereof, and a wireless terminal thereof without requiring the communication cost and suitable for automating the storage/delivery management of the traveling apparatus.

To attain the objective above, the present invention is constituted as a wireless data collecting system comprising a wireless terminal mounted on a predetermined movable traveling apparatus, and obtaining and wirelessly transmitting operation data of the traveling apparatus, and a base station apparatus receiving said operation data wirelessly transmitted from the wireless terminal. The base station apparatus comprises storage beacon transmitting means for transmitting storage beacon including at least a predetermined response request signal for the wireless terminal and operation data receiving means for receiving the operation data from the wireless terminal which has responded to the response request signal. The wireless terminal comprises data memorizing means for memorizing the operation data obtained from the traveling apparatus, transmission possibility determining means for determining transmission possibility of the operation data to the base station apparatus and operation data transmitting means for transmitting the operation data in the data memorizing means after transmitting a response to the response request signal when the transmission possibility determining means determines that transmission is possible.

With this constitution, since the wireless terminal automatically determines the possibility of transmitting the operation data to the base station apparatus, the operation data are collected automatically without manual intervention.

Also, the wireless terminal may comprise state switching means for switching between a storage wait state where the response request signal is received and another state based on record of communication with the base station apparatus.

With this constitution, it is automatically determined whether the traveling apparatus on which the wireless terminal is mounted is in the storage wait state or not.

Further, the transmission possibility determining means in the wireless terminal may determine the transmission possibility of transmitting the operation data based on one or more of the electric field intensity of a signal transmitted from the base station apparatus, the existence of the operation data which has not been transmitted to the base station apparatus, an elapsed time after switching of the state by the state switching means, and a difference between a planned storage date set in advance and the current date.

With this constitution, such cases are prevented that though the beacon is received, frequent communication errors occur (the error rate of the data increases), and consequently, the communication time increases and useless electric power is consumed (a battery becomes empty). Such cases are also prevented that the operation data are not normally transmitted, and the wireless terminal during delivery which has not generated the operation data, or the wireless terminal incidentally traveling the communication area of the base station apparatus responds to the base station apparatus by mistake. Thus, the operation data are surely collected from the wireless terminal to the specified base station apparatus.

Also, the base station apparatus may include delivery beacon transmitting means for transmitting delivery beacon including a predetermined initialization signal for the wireless terminal of the traveling apparatus to be delivered, and the state switching means of the wireless terminal switching at least between the storage wait state and the delivery wait state for receiving the initialization signal.

In this case, the state switching means of the wireless terminal may be in the storage wait state when the reception of the initialization signal from the base station apparatus has been completed, and it may be in the delivery wait state when the transmission of the operation data to the base station apparatus has been completed.

With this constitution, since the storage wait state and the delivery wait state are automatically switched according to the communication record, and the signal corresponding the individual state (the response request signal or the initialization signal) is received by the wireless terminal, the initialization for collecting the operation data and delivering the wireless terminal are conducted without manual intervention. Thus, it is preferable for automating the delivery/storage management of the traveling apparatus.

Further, when the wireless terminal comprises operation prohibiting means for prohibiting the operation of the traveling apparatus from operating when the wireless terminal is in the delivery wait state, if the traveling apparatus managed without human attendance is stolen by any chance, the traveling apparatus is not used illegally, and the constitution realizes antitheft capability.

Also, when the base station apparatus comprises wireless terminal state determining means for determining that the wireless terminal which is a transmission source of the operation data whose reception has been completed is in the delivery wait state, and the wireless terminal which is a transmission destination of the initialization signal whose transmission has been completed is in the storage wait state, the traveling apparatuses which exist (should exist) in a warehouse or the like are easily recognized. Thus, for example, when the traveling apparatus is stolen, since it is easy to recognize that the traveling apparatus which should exist does not exist, it is easy to recognize an occurrence of the steal.

Also, the initialization signal may include information on the planned storage date, and the wireless terminal may set the planned storage date based on the initialization signal.

Also, such constitution that communication data between the base station apparatus and the wireless terminal include an apparatus ID for respectively identifying the wireless terminal, and the wireless terminal of a transmission destination and/or a transmission source of the communication data is identified based on the apparatus ID may be possible.

Each of said storage beacon and said delivery beacon may be one of a plurality of channel signals which are different in frequency, and the wireless terminal may include reception channel switching means for switching which of the channel signals is received according to the switching state by the state switching means.

With this constitution, since the transmission of the initialization signal and the transmission of the response request signal are conducted in parallel, high speed communication is enabled.

Also, the present invention may be recognized as a base station apparatus of a wireless data communication system. In a wireless data collecting system comprising a wireless terminal mounted on a predetermined movable traveling apparatus, and obtaining and wirelessly transmitting operation data of the traveling apparatus, and a base station apparatus receiving said operation data wirelessly transmitted from the wireless terminal, the base station apparatus comprises storage beacon transmitting means for transmitting storage beacon including at least a predetermined response request signal to the wireless terminal in a storage wait state, delivery beacon transmitting means for transmitting delivery beacon including at least a predetermined initialization signal to the wireless terminal in a delivery wait state, operation data reception means for receiving the operation data from the wireless terminal which has responded to the response request signal; and wireless terminal state determining means for determining that the wireless terminal which is a transmission source of the operation data whose reception has been completed is in the delivery wait state for receiving the initialization signal, and the wireless terminal which is a transmission destination of the initialization signal whose transmission has been completed is in the storage wait state for receiving said response request signal.

Also, the present invention may be recognized as a wireless terminal of a wireless data collecting system. Namely, in a wireless data collecting system comprising a wireless terminal mounted on a predetermined movable traveling apparatus, and obtaining and wirelessly transmitting operation data of the traveling apparatus, and a base station apparatus receiving said operation data wirelessly transmitted from the wireless terminal, the wireless terminal comprises data memorizing means for memorizing the operation data obtained from the traveling apparatus, transmission possibility determining means for determining transmission possibility of the operation data to said base station apparatus, and operation data transmitting means for transmitting the operation data in the data memorizing means after transmitting a response to a predetermined response request signal included in storage beacon transmitted from the base station apparatus when the transmission possibility determining means determines that transmission is possible.

Further, state switching means for switching between a storage wait state where the response request signal is received and another state based on record of communication with the base station apparatus may be provided, and the transmission possibility determining means may determine the transmission possibility of the operation data based on one or more of the electric field intensity of a signal transmitted from the base station apparatus, the existence of the operation data which has not been transmitted to the base station apparatus, an elapsed time after switching of the state by the state switching means, and a difference between a planned storage date set in advance and the current date.

BRIEF DESCRIPTION OF THE DRAWINGS

FIG. 4 is a flowchart showing communication steps on delivery of a traveling apparatus in the wireless data collecting system X relating to the embodiment of the present invention.

PREFERRED EMBODIMENT OF THE INVENTION

Referring to appended drawings, the following section describes an embodiment of the present invention for comprehending the present invention. The following embodiment is an example of embodying the present invention, and it in nature does not limit the technical scope of the present invention.

The wireless data collecting system X according to the embodiment of the present invention is a system which wirelessly collects operation data (such as ON/OFF of the engine, the existence of the fuel, the hydraulic pressure, and the coolant temperature) on an apparatus which travels (referred to as traveling apparatus hereafter) such as a construction machine from the traveling apparatus to a base station provided at a predetermined location, and simultaneously, manages storage/delivery of the traveling apparatus.

Figure 1:
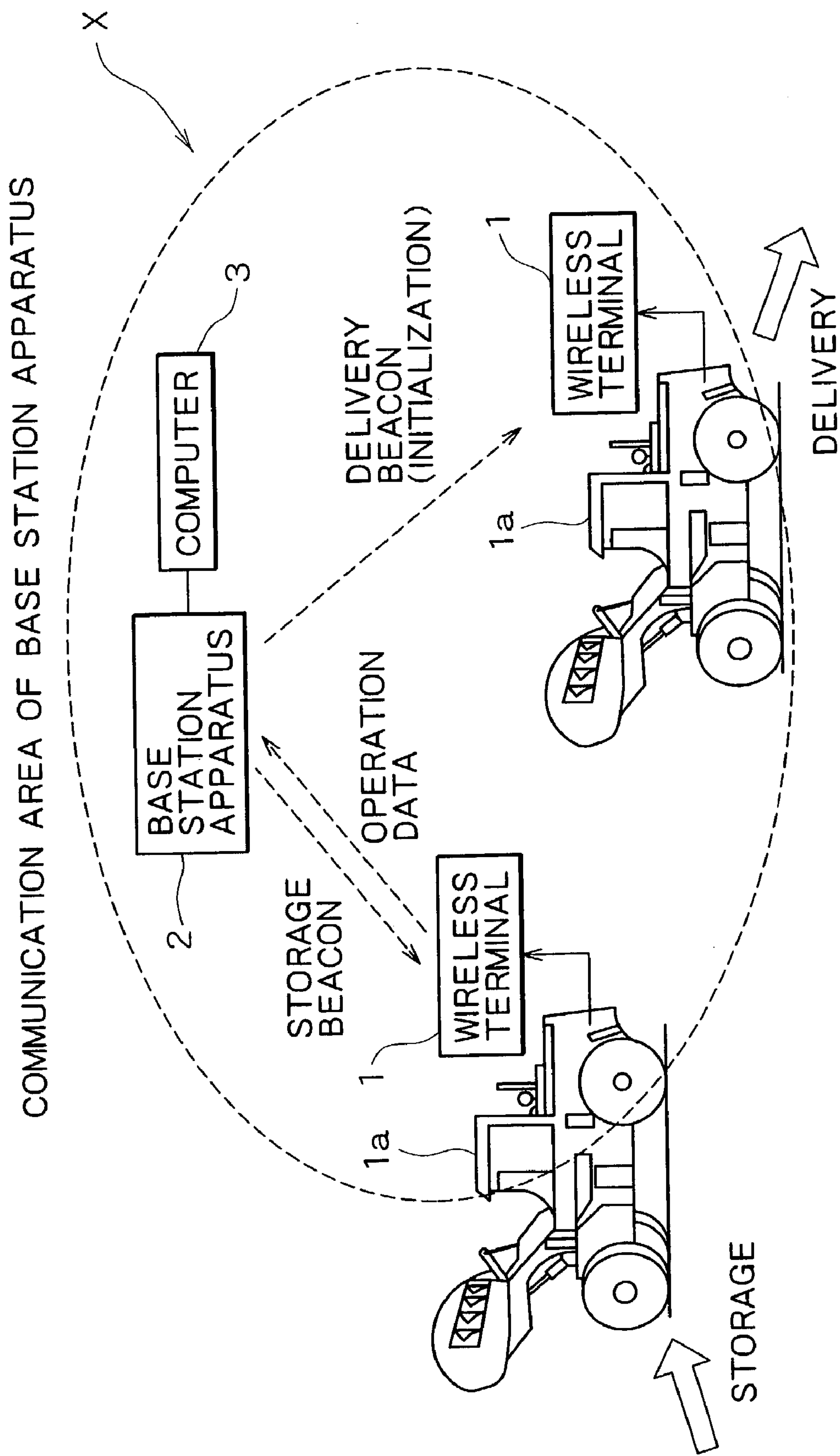
FIG. 1 is a drawing showing a schematic constitution of a wireless data collecting system X according to an embodiment of the present invention.

First, referring to FIG. 1, description is provided for the constitution of the present wireless data collecting system X.

As shown in FIG. 1, the wireless data collecting system X includes one or more wireless terminals 1, a base station apparatus 2 and a computer 3. The wireless terminals 1 are provided on a traveling apparatus 1*a*, and wirelessly transmit the operation data on the traveling apparatus. The base station apparatus 2 is provided at a predetermined location such as a warehouse or an assembly yard (referred to as warehouse or the like hereafter) which is a storage place of the traveling apparatus 1*a*, and receives the operation data respectively from the one or more wireless terminals 1. The computer 3 is a personal computer or the like, connected with the base station apparatus 2 with a LAN or the like for communication, and accumulates the operation data for conducting different types of processing such as maintenance management and storage/delivery management of the traveling apparatus 1*a*.

A characteristic of the present wireless data collecting system X is that the system wirelessly collects the operation data memorized in the wireless terminal 1 from the wireless terminal 1 of the traveling apparatus 1*a* when it has entered in a predetermined communication area (such as an area close to an entrance/exit of the warehouse or the like) of a base station apparatus 2 provided in the warehouse or the like for storage after the apparatus has once memorized the operation data at the operation site in the wireless terminal 1. The system X does not wirelessly transmit the operation data from a respective operation site (such as a construction site) of the traveling apparatus 1*a*. SS radio transmission, for example, in 2.45 GHz band (communication speed is 5 Mbps or more) is used as the radio wave for the wireless communication.

Figure 2:
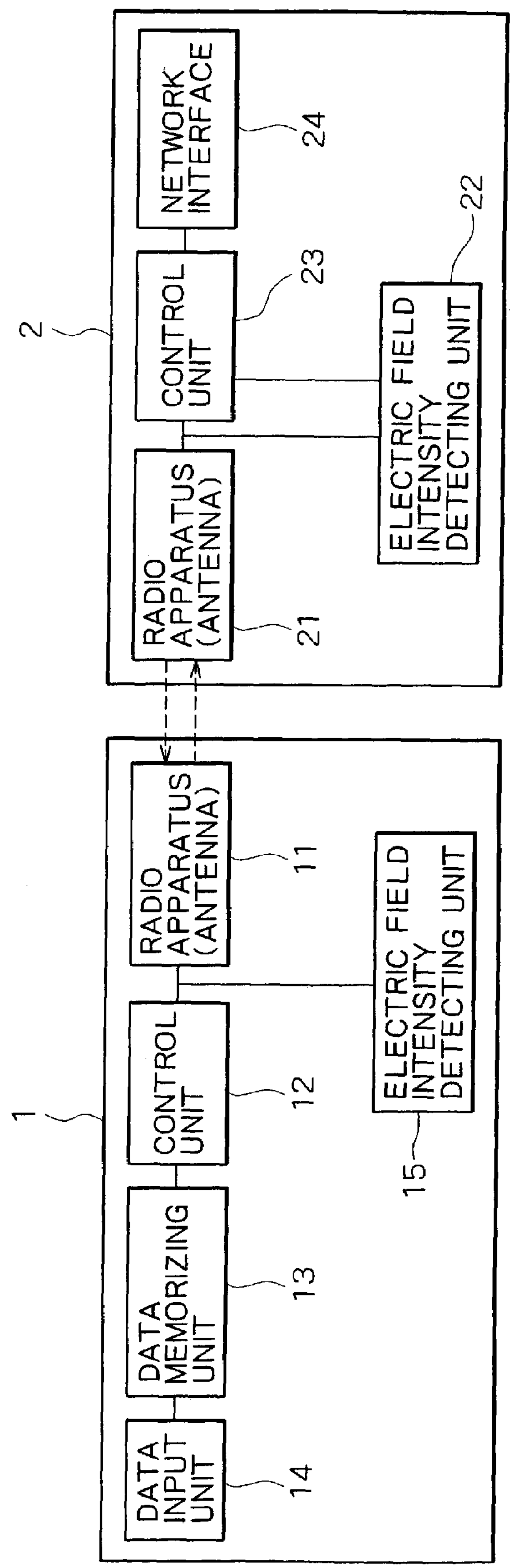
FIG. 2 is a block diagram showing a schematic constitution of a wireless terminal and a base station apparatus constituting the wireless data collecting system X according to the embodiment of the present invention.

Then, referring to FIG. 2, a description is provided for the constitution of individual apparatuses constituting the present wireless data collecting system X.

The wireless terminal 1 includes a data input unit 14 (an example of the operation data input means), a data memorizing unit 13 (an example of the data memorizing means), a control unit 12, a radio apparatus 11 and an electric field intensity detecting unit 15. The data input unit 14 receives the operation data from a predetermined sensor or the like of the traveling apparatus 1*a*. The data memorizing unit 13 is an SRAM or the like, for memorizing the received operation data and other data. The control unit 12 conducts communication control for wirelessly transmitting the operation data to the base station apparatus 2, and various arithmetic processing. The radio apparatus 11 is provided with a predetermined antenna for transmitting and receiving wireless data. The electric field intensity detecting unit 15 detects the electric field intensity of a signal received by the radio apparatus 11.

The base station apparatus 2 includes a radio apparatus 21, an electric field intensity detecting unit 22, a control unit 23 and a network interface 24 (network I/F). The radio apparatus 21 is provided with a predetermined antenna for receiving the operation data wirelessly transmitted from the wireless terminal 1. The electric field intensity detecting unit 22 detects the electric field intensity of a signal received by the radio apparatus 21. The control unit 23 conducts communication control for data reception by the radio apparatus 21, and various arithmetic processing. The network interface 24 conducts communication control with the computer 3 through a communication line such as a LAN for forwarding the received operation data and the like. When the communication speed by the network interface I/F 24 is slower than the data communication speed by the radio apparatus 21, a memorizing apparatus such as an SRAM and a hard disk may be provided in the base station apparatus 2 so that the communication data are temporarily memorized while the memorizing apparatus is used as a buffer. Further, the base station apparatus 2 uses the radio apparatus 21 to supply beacon which is a radio signal emitted within a predetermined communication area (within a limited area close to the entrance/exit of the warehouse or the like) at a predetermined period. The radio apparatus 11 of the wireless terminal 1 responds the beacon to conduct the communication between the base station apparatus 2 and the wireless terminal 1. The base station apparatus 2 collects the operation data which were memorized in the data memorizing unit 13 during the operation on the construction site or the like, in the communication between the base station apparatus 2 and the wireless terminal 1. The collected operation data are transmitted to the computer 3 for accumulating (memorizing). The beacon is constituted by beacons in multiple channels (multiple channel signals) with respectively different frequencies (frequency bands). One channel of them is used for communication with the traveling apparatus 1*a* waiting for delivery (traveling apparatus 1*a* brought from the warehouse or the like to a construction site and the like), and another channel is used for communication with the traveling apparatus 1*a* waiting for storage (traveling apparatus 1*a* having returned from a construction site and the like to the warehouse or the like). In this constitution, it is possible to conduct in parallel the transmission of the beacon for transmitting initialization data and the like to the traveling apparatus waiting for delivery (referred to as delivery beacon hereafter, an example of the initialization signal), and the transmission of the beacon for requesting a response from the traveling apparatus for waiting for storage (an example of the response request signal, referred to as storage beacon hereafter). Accordingly, high speed communication is enabled.

The beacon in the present invention means a signal comprising a special pattern of fixed data which are common in the present system. When an apparatus receives the beacon, it can recognize that the beacon relates to the present system by the special pattern. Further, in the beacon, the special pattern can be followed by a data pattern which indicates that the beacon is transmitted from a base station or a specific ID number of a base station. The beacon in the present invention includes also such a beacon, which make an apparatus receiving the beacon recognize not only that the beacon relates to the present invention but also whether the beacon is transmitted from a base station including its ID number The beacon in the present invention further includes the initialization data or the response request signal.

The electric field intensity detecting unit 22 in the base station apparatus 2 is provided in order to evaluate the reliability of the data transmitted from the wireless terminal 1 by the electric field intensity of the reply signal from the wireless terminal 1, for example, its terminal ID.

Figure 3:
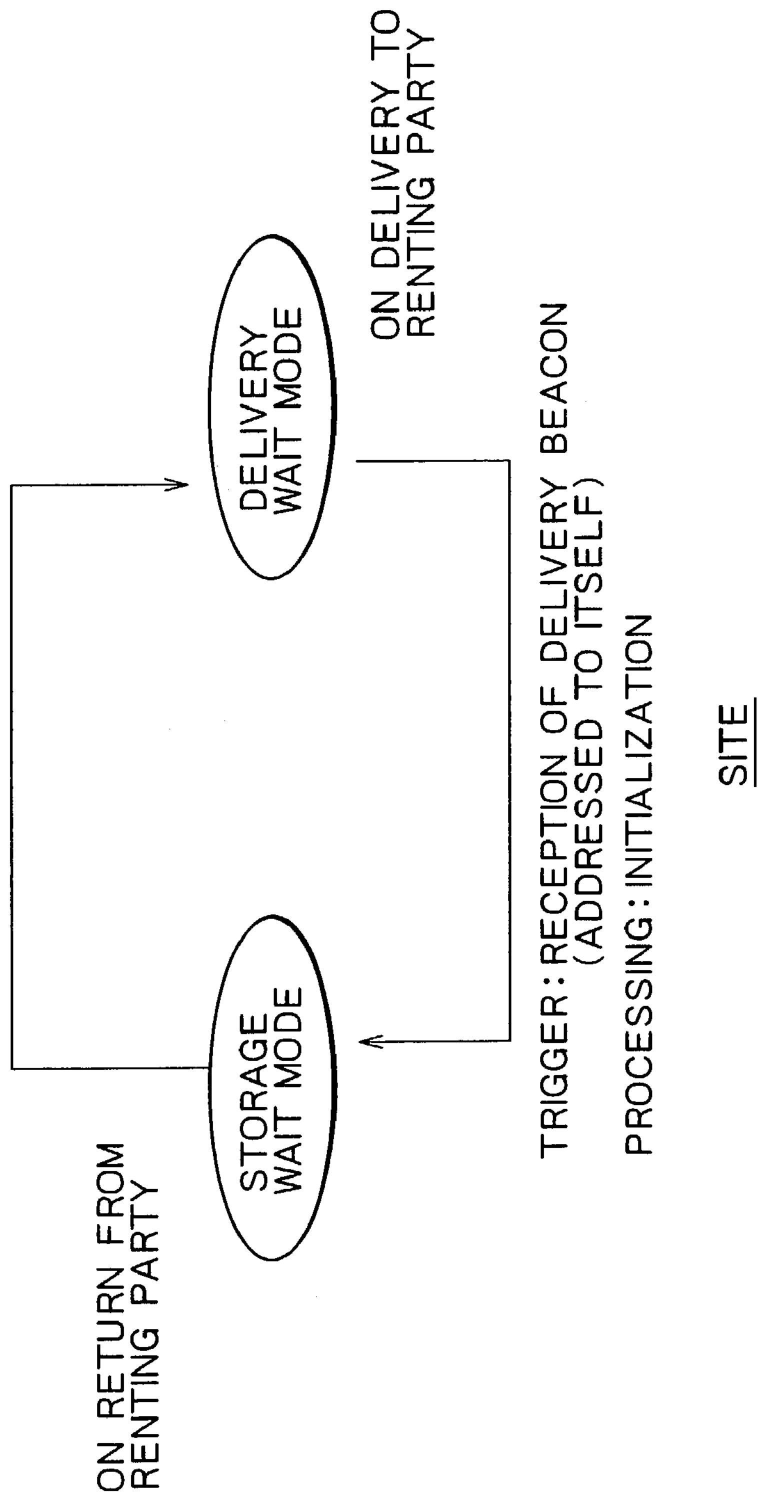
FIG. 3 is a drawing showing state transition on the wireless terminal side in the wireless data collecting system X relating to the embodiment of the present invention.

As shown in FIG. 3, the wireless terminal 1 is constituted such that it is automatically set to either one mode (state) of two modes of a delivery wait mode and a storage wait mode (memorized in the data memorizing unit 13), and is set to the delivery wait mode in the initial state. To which mode the control unit 12 of the wireless terminal 1 switches is described later. Further, the radio apparatus 11 in the wireless terminal 1 has a function for switching which channel of the beacon is received. The channel to be received is switched according to the mode. Namely, in the delivery wait mode, the reception channel (reception frequency band) of the radio apparatus 11 of the wireless terminal 1 is switched to the channel of the delivery beacon, and in the storage wait mode, the reception channel of the radio apparatus 11 is switched to the channel of the storage beacon. Consequently, in the storage wait mode, the storage beacon can be received, and in the delivery wait mode, the delivery beacon can be received.

Then, using FIG. 4, the following section describes communication steps between the base station apparatus 2 and the wireless terminal 1 when the traveling apparatus 1*a* on which the wireless terminal 1 is mounted is delivered from the warehouse or the like. In the following section, S101, S102, . . . mean numbers of the processing steps.

First, in the base station apparatus 2, the procedure enters into a state of waiting for input of a delivery instruction from the computer 3 (No for S201). The delivery instruction includes an apparatus ID for specifying (identifying) the traveling apparatus 1*a* to be delivered and predetermined initialization data relating to the delivery date and time and planned storage date and time (planned date and time for returning the rental apparatus). When it is determined that the delivery instruction is entered (Yes for S201), the delivery beacon including the apparatus ID and the initialization data is transmitted through the radio apparatus 21 (S202).

On the other hand, in the wireless terminal 1 in the delivery wait mode, processing for receiving the delivery beacon is repeated at a predetermined period until it receives the delivery beacon including the apparatus ID the same as its own apparatus ID (No for S101). Its own apparatus ID is set (memorized) in advance in the data memorizing unit 13 or the like of the respective wireless terminal 1. Then, when the wireless terminal 1 in the delivery wait mode receives the delivery beacon including its own apparatus ID (Yes for S101), initialization such as memorizing the delivery data and time and the planned storage date and time, and initializing the operation data is conducted based on the initialization data included in the received delivery beacon (S102).

Then, the number of transmitting an initialization completion message described later (initial value=0) to the base station apparatus is checked (S103). The initialization completion message indicating that initialization has been completed is transmitted to the base station apparatus 2 if this number is equal or less than a predetermined upper limit number (trial number upper limit) (S104). At this time, the number of transmitting the initialization completion message is incremented (not shown). Further, it is checked whether an ACK message which indicates that the initialization completion message has been received is received from the base station apparatus 2 (S105). The delivery processing in the wireless terminal 1 ends after the mode is switched (moved) to the storage wait mode (S106, an example of processing corresponding to the state switching means) if it is determined that the ACK message is received. In S105, if it is determined that the ACK message is not received, namely the ACK message is not received in a predetermined timeout period, the procedure returns to S103, and the processing from S103 through S105 is repeated until the ACK message is received. Then, when the number of transmitting the initialization completion message exceeds the upper limit (No for S103), the delivery processing in the wireless terminal 1 ends after a predetermined error processing is executed (S110). In the error processing, for example, such processing as turning on an indication lamp showing that a communication error has occurred is conducted. The wireless terminal 1 recovers from the error state (returns to S101, for example) when a user who confirms the turning on of the indication lamp and the like conducts a predetermined reset operation and the like (not shown).

On the other hand, in the base station apparatus 2, after the transmission of the delivery beacon (S202), it is determined whether the initialization completion message has received from the wireless terminal 1 or not before the predetermined timeout period has elapsed (S203). The procedure returns to S201 for repeating the processing after the ACK message indicating that the initialization completion message is received is transmitted to the wireless terminal 1 (S204), if it is determined that the initialization completion message is received before the timeout period has elapsed. At this time, a predetermined storage wait mode notice including the apparatus ID of the wireless terminal 1 from which the initialization completion message has been received is transmitted from the base station apparatus 2 to the computer 3 (not shown). Wireless terminal mode information indicates which mode of the storage wait mode and the delivery wait mode (the traveling apparatus 1*a* of) the individual wireless terminal 1 is in. The wireless terminal mode information is recorded in the computer 3 (initial value="delivery wait mode"). The computer 3 updates the wireless terminal mode information on (the traveling apparatus 1*a* provided with) the wireless terminal 1 corresponding to the apparatus ID included in the storage wait mode notice to information indicating the storage wait mode (not shown). The processing in S203 is an example of processing corresponding to the wireless terminal state determining means. Further, the computer 3 has a function showing which of the wireless terminals 1 (the traveling apparatus 1*a*) exist (namely in the delivery wait state) or not (namely in the storage wait state) in the warehouse or the like on a display such as a CRT.

The wireless terminal 1 which is initialized, and is set to the storage wait mode as described above memorizes the operation data in the data memorizing unit 13 when the traveling apparatus 1*a* operates in an applied place such as a construction site. The wireless terminal 1 transmits the operation data in response to the storage beacon transmitted from the base station apparatus 2 when it returns to the communication area of the base station apparatus 2 again for storage.

Figure 5:
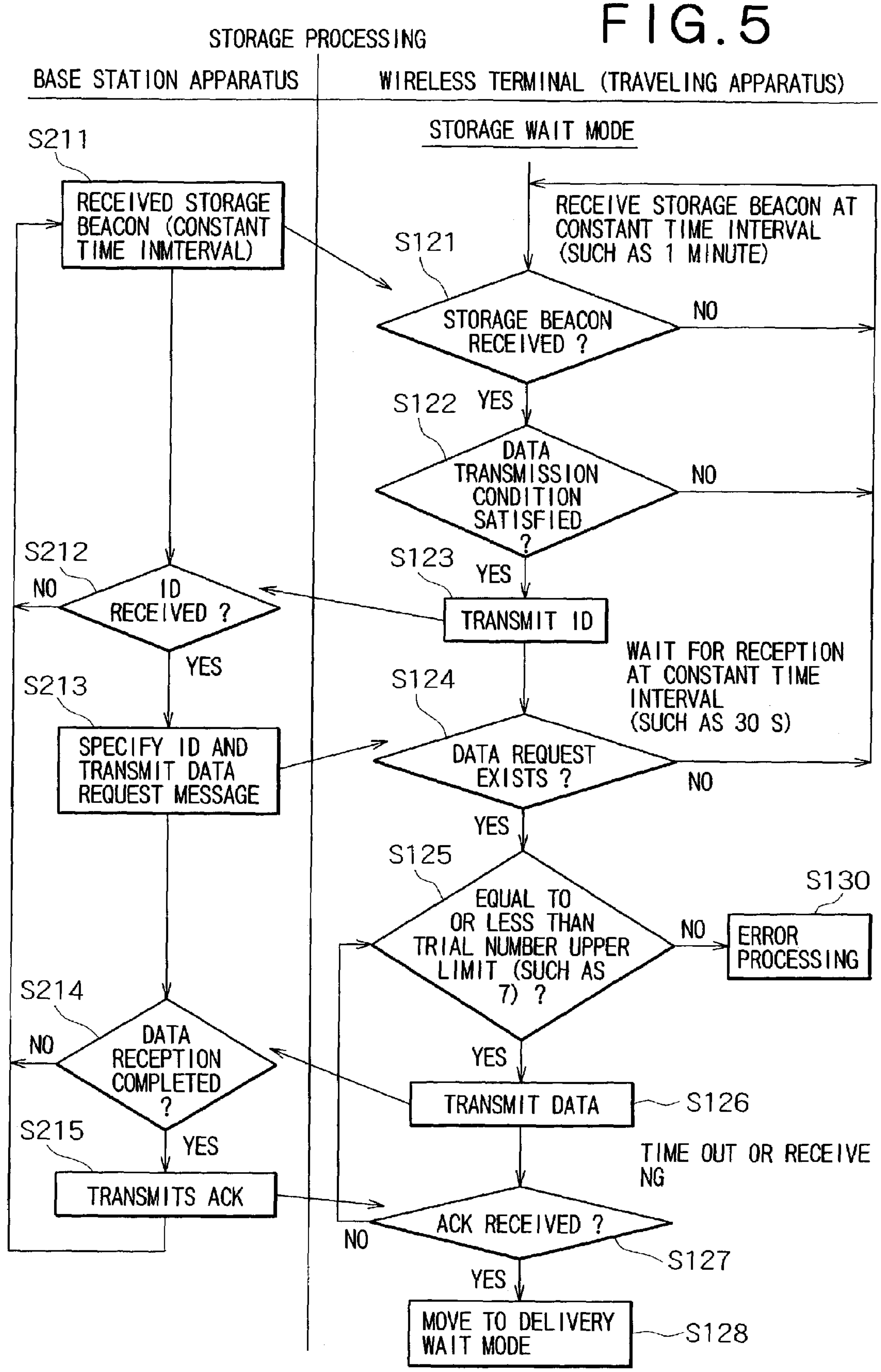
FIG. 5 is a flowchart showing communication steps on storage of the traveling apparatus in the wireless data collecting system X relating to the embodiment of the present invention.

Then, using FIG. 5, the following section describes communication steps between the base station apparatus 2 and the wireless terminal 1 when the traveling apparatus 1*a* on which the wireless terminal 1 is mounted is stored into the warehouse or the like.

First, the radio apparatus 21 of the base station apparatus 2 transmits the storage beacon requiring a response at a predetermined period to the wireless terminal 1 in the communication area (in the area which the beacon can reach) (S211). In response, the wireless terminal 1 in the storage wait mode always checks the reception of the storage beacon at a predetermined period (S121). When the storage beacon is received after entering into the communication area (Yes for S121), it is determined whether a predetermined data transmission condition is satisfied (S122, an example of processing corresponding to the transmission possibility determining means). The data transmission condition is a condition for determining the possibility of transmitting the operation data to the base station apparatus 2. The processing is repeated after the procedure returns to S121 if the condition is not met. The procedure moves to S123 if the condition is met and the processing for transmitting the operation data to the base station apparatus 2 starts. Here, while when the following four conditions are all met, it is determined the data transmission condition is met. It may be determined that the data transmission condition is met, if one or more of the four conditions are met.

The first condition is that time equal to or more than a predetermined period (such as three minutes) has elapsed after the state (mode) of the wireless terminal 1 switches from the delivery wait mode to the storage wait mode (S106 in FIG. 4) (elapsed time after switching is equal to or more than the predetermined time). With this condition, it is possible to prevent executing transmission processing (S123 through S127) described later, and the processing of switching to the delivery wait mode (S128) while the wireless terminal 1 (the traveling apparatus 1*a*), which is initialized and switched to the storage wait mode by the processing on the delivery described before (FIG. 4), still remains in the communication area of the base station apparatus 2.

The second condition is that there exist operation data which have not been transmitted to the base station apparatus 2 yet in the data memorizing unit 13. This also has an effect similar to that of the first condition described above, which prevents the wireless terminal 1 which has been initialized and has not yet departed from the communication area from conducting the processing for transmitting the operation data, and switching to the delivery wait mode. Conceivable methods for checking the existence of the operation data which have not been transmitted are, for example, such a method that the operation data whose transmission to the base station apparatus 2 has been completed are deleted from the data memorizing unit 13 (or deleted in the initialization processing for delivery), and the existence of the data which have not been transmitted is determined by the existence of the operation data in the data memorizing unit 13, and such a method that identification information on whether the operation data have been transmitted or not is memorized in the data memorizing unit 13, and the existence of the data which have not been transmitted is determined by the identification information.

A third condition is that a difference between the planned storage date and time memorized in the data memorizing unit 13 by the initialization processing on delivery described above and the current data and time or the date is within a predetermined range (or agree with each other). With this condition, in addition to an effect similar to those of the first and second conditions, it is possible to prevent the wireless terminal 1 of the traveling apparatus 1*a* happening to pass through the communication area of the base station apparatus 2 (the traveling apparatus 1*a* which is not planned to be stored in the warehouse or the like) from responding to the storage beacon by mistake.

A fourth condition is that the field intensity of the beacon detected by the field intensity detecting unit 15 is equal to or more than a predetermined field intensity. With this condition, it is possible to prevent such cases that though the beacon is received, frequent communication errors occur (the error rate of the data increases), and consequently, the communication time increases and useless electric power is consumed, and the operation data are not normally transmitted.

When the wireless terminal 1 satisfies the four conditions (the data transmission condition) (Yes for S122), it transmits its own apparatus ID to the base station apparatus 2 as a response to the storage beacon (S123). In response to this, when the base station apparatus 2 receives the apparatus ID from any of the wireless terminals 1 within a predetermined timeout period (Yes for S212) after it transmits the storage beacon (S211), it transmits a predetermined data request message including the received apparatus ID to the wireless terminal 1 (S213). At this time, when the apparatus ID is not received within the timeout period (No for S212), the procedure returns to S211 for repeating the processing.

In contrast, when the wireless terminal 1 in the storage wait mode does not receive the data request message including its apparatus ID within a predetermined period (30 seconds, for example) after it transmits its apparatus ID (S123), the procedure returns to S121 for repeating the processing. When the wireless terminal 1 receives the message within the predetermined period (Yes for step S124), the procedure moves to S125.

In S125, the number of execution (initial value=0) of the processing (S126) for transmitting the operation data, which is the next processing, is checked. When this number is equal to or less than a predetermined upper limit number (upper limit of number of trials), the operation data in the data memory unit 13 which have not been transmitted are transmitted to the base station apparatus 2 (S126). At the transmission of the operation data, the execution number of the processing for transmitting the operation data is incremented (not shown). Further, it is checked whether an ACK message from the base station apparatus 2 is received (S127). The ACK message indicates that the operation data have been received. The storage processing in the wireless terminal 1 ends after the mode is switched (moved) to the delivery wait mode (S128, an example of processing corresponding to the state switching means), if it is determined that the ACK message is received. In contrast, when it is determined that the ACK message is not received in S127 (or a message indicating that the reception of the operation data failed is received), the procedure returns to S125, and the processing in S125 through S127 is repeated until the ACK message is received. Then, when the number of transmitting the operation data exceeds the upper limit (No for S125), the delivery processing in the wireless terminal 1 ends after a predetermined error processing is executed (S130). In the error processing, for example, such processing as turning on an indication lamp showing that a communication error has occurred is conducted. Here, the processing in S123 through S127 is an example of processing corresponding to the operation data transmitting means.

On the other hand, in the base station apparatus 2, it is determined whether the reception of the operation data from the wireless terminal 1 has been completed or not (S214) before a predetermined timeout period has elapsed after the data request message is transmitted (S213). When it is determined that the reception of the operation data has been completed before the timeout period has elapsed, the procedure returns to the processing for transmitting the storage beacon described above (S211) after the ACK message indicating that the reception of the operation data has been completed is transmitted to the wireless terminal 1 (215). At this time, a predetermined delivery wait mode notice including the apparatus ID of the wireless terminal 1 whose operation data has completely received is transmitted from the base station apparatus 2 to the computer 3 (not shown). The computer 3 updates the wireless terminal mode information on the wireless terminal 1 (the traveling apparatus 1*a*) corresponding to the apparatus ID included in the delivery wait mode notice to information indicating the delivery wait mode (not shown). Here, the determination processing in S214 is an example of processing corresponding to the wireless terminal state determining means, and the processing in S213 to S215 is an example of processing corresponding to the operation data receiving means.

If it is determined that the reception of the operation data has not been completed in the timeout period in S214, the procedure returns to S211 directly (or after transmitting a message indicating that the data reception failed) for repeating the processing.

The wireless terminal 1, which has completed the transmission of the operation data, and is set to the delivery wait mode as described above, enters into the state of waiting for receiving the delivery beacon in the delivery processing (FIG. 4) (S101).

In the wireless data collecting system X, such constitution may be conceivable that when the wireless terminal 1 is switched to the delivery wait mode in S128 in FIG. 5, the operation of the traveling apparatus 1*a* on which the wireless terminal 1 is mounted is prohibited, and when it is switched to the storage wait mode in S106 in FIG. 4, the operation of the traveling apparatus 1*a* is permitted (for example, the circuit is constituted such that a signal line is turned off/on by turning on/off a predetermined operation prohibiting signal from the wireless terminal 1). Consequently, if the traveling apparatus in the warehouse or the like is stolen by any chance, the traveling apparatus is not used illegally, and the constitution realizes antitheft capability.

Also, the computer 3 may be constituted so as to communicate with multiple base station apparatuses 2 through WAN and public line, and to centrally manage the storage and delivery of the traveling apparatuses in the multiple warehouses or the like in stead of providing it for the individual base station apparatus 2.

In the embodiment above, the mode is switched between the storage waiting mode and the delivery waiting mode However, an embodiment in which the mode is always the storage delivery mode is possible. In this case, when the wireless terminal 1 receives the storage beacon form the base station apparatus 2, the wireless terminal 1 transmits operation data accumulated so far to the base station apparatus 2, clears the transmitted operation data in the data memorizing unit 13 and begins data collecting operation immediately.

In stead of the aforementioned first condition of the data transmission condition, it can be constituted such that storage beacon receiving operation is not conducted during a predetermined period (for example, several hours) after the mode is switched to the storage waiting mode. Electric power consumption relating to the reception of the storage beacon can be eliminated in the period, electric power consumption can be reduced.

What is claimed is:

1. A wireless data collecting system comprising:

a wireless terminal mounted on a predetermined movable traveling apparatus, and obtaining and wirelessly transmitting operation data of said traveling apparatus; and a base station apparatus receiving said operation data wirelessly transmitted from said wireless terminal, said base station apparatus comprising:

storage beacon transmitting means for transmitting storage beacon including at least a predetermined response request signal for said wireless terminal; and operation data receiving means for receiving said operation data from said wireless terminal which has responded to said response request signal, said wireless terminal comprising:

data memorizing means for memorizing said operation data obtained from said traveling apparatus;

transmission possibility determining means for determining possibility of transmitting said operation data to said base station apparatus;

operation data transmitting means for transmitting said operation data in said data memorizing means after transmitting a response to said response request signal when said transmission possibility determining means determines that transmission is possible; and state switching means for switching between a storage wait state where said response request signal is received and a delivery wait state, based on a record of communication with said base station apparatus.

wherein said transmission possibility determining means in said wireless terminal determines the possibility of transmitting said operation data, based on the electric field intensity of a signal transmitted from said base station apparatus.

2. The wireless data collecting system according to claim 1, wherein said transmission possibility determining means in said wireless terminal determines the possibility of transmitting said operation data, further based on the existence of said operation data which has not been transmitted to said base station apparatus.

3. The wireless data collecting system according to claim 1, wherein said transmission possibility determining means in said wireless terminal determines the possibility of transmitting said operation data, further based on an elapsed time after switching of the state by said state switching means.

4. The wireless data collecting system according to claim 1, wherein said transmission possibility determining means in said wireless terminal determines the possibility of transmitting said operation data, further based on a difference between a planned storage date set in advance and the current date.

5. The wireless data collecting system according to claim 1, wherein said base station apparatus further comprises delivery beacon transmitting means for transmitting a delivery beacon including at least a predetermined initialization signal for said wireless terminal of said traveling apparatus, and said state switching means of said wireless terminal switches at least between said storage wait state and said delivery wait state for receiving said initialization signal.

6. The wireless data collecting system according to claim 5, wherein said state switching means of said wireless terminal is in said storage wait state when the reception of said initialization signal from said base station apparatus has been completed, and said state switching means is in said delivery wait state when the transmission of said operation data to the base station apparatus has been completed.

7. The wireless data collecting system according to claim 5, wherein said wireless terminal comprises operation prohibiting means for prohibiting said traveling apparatus from operating when said wireless terminal is in said delivery wait state.

8. The wireless data collecting system according to claim 5, wherein said base station apparatus further comprises wireless terminal state determining means for determining that said wireless terminal which is a transmission source of said operation data whose reception has been completed is in said delivery wait state, and said wireless terminal which is a transmission destination of said initialization signal whose transmission has been completed is in said storage wait state.

9. The wireless data collecting system according to claim 4, wherein an initialization signal includes information on said planned storage date and said wireless terminal sets said planned storage date based on said initialization signal.

10. The wireless data collecting system according to claim 1, wherein communication data between said base station apparatus and said wireless terminal include an apparatus ID for respectively identifying said wireless terminal, and said wireless terminal of a transmission destination and/or a transmission source of the communication data is identified based on said apparatus ID.

11. The wireless data collecting system according to claim 5, wherein each of said storage beacon and said delivery beacon is one of a plurality of channel signals which are different in frequency, and said wireless terminal includes reception channel switching means for switching which of said channel signals is received according to the switching state by said state switching means.

12. A wireless terminal of a wireless data collecting system, wherein the wireless terminal is mounted on a predetermined movable traveling apparatus for obtaining and wirelessly transmitting operation data of said traveling apparatus, the wireless data collecting system further comprising a base station apparatus receiving said operation data wirelessly transmitted from said wireless terminal, said wireless terminal comprising:

data memorizing means for memorizing said operation data obtained from said traveling apparatus; transmission possibility determining means for determining possibility of transmitting said operation data to said base station apparatus;

operation data transmitting means for transmitting said operation data in said data memorizing means after transmitting a response to a predetermined response request signal included in storage beacon transmitted from said base station apparatus when said transmission possibility determining means determines that transmission is possible; and state switching means for switching between a storage wait state where said response request signal is received and a delivery wait state, based on a record of communication with said base station apparatus.

wherein said transmission possibility determining means in said wireless terminal determines the possibility of transmitting said operation data, based on the electric field intensity of a signal transmitted from said base station apparatus.

13. The wireless terminal of the wireless data collecting system according to claim 12, wherein said transmission possibility determining means in said wireless terminal determines the possibility of transmitting said operation data, further based on the existence of said operation data which has not been transmitted to said base station apparatus.

14. The wireless terminal of the wireless data collecting system according to claim 12 wherein said transmission possibility determining means in said wireless terminal determines the possibility of transmitting said operation data, further based on an elapsed time after switching of the state by said state switching means.

15. The wireless data collecting system according to claim 12, wherein said transmission possibility determining means in said wireless terminal determines the possibility of transmitting said operation data, further based on a difference between a planned storage date set in advance and the current date.

* * * * *